Figure 1:
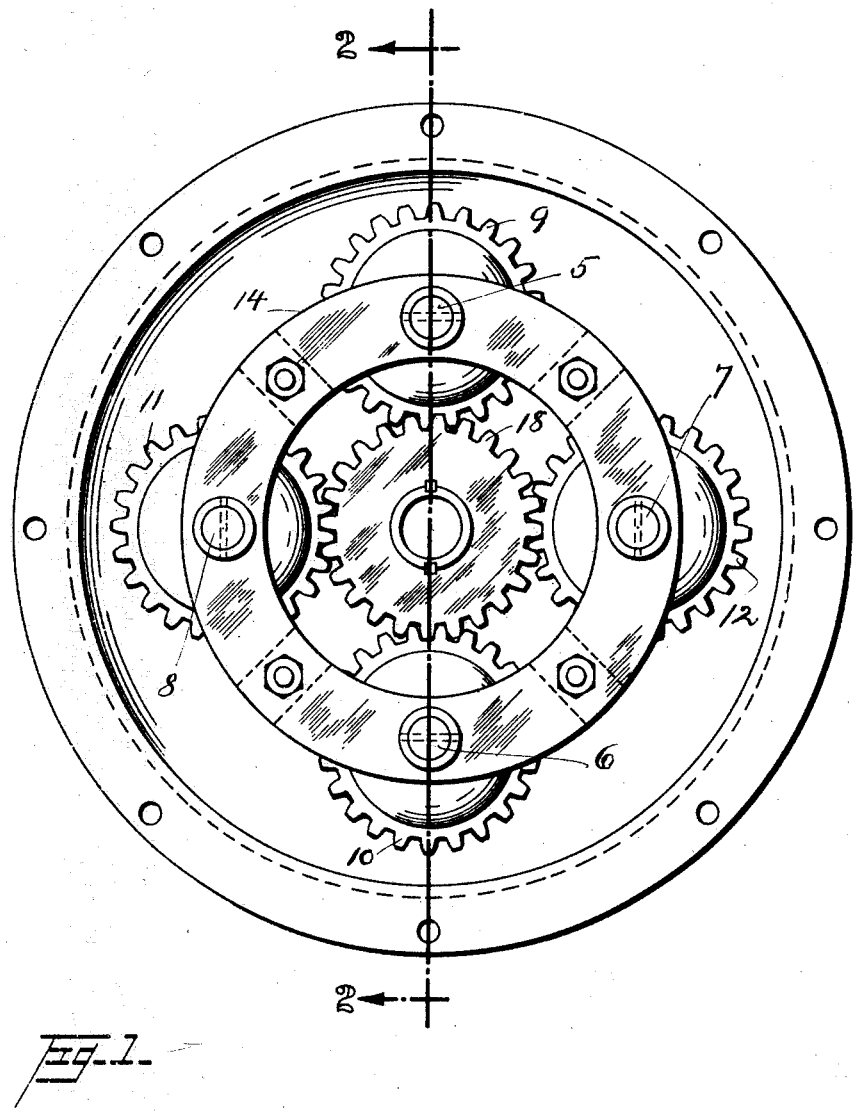

Dec. 25, 1928.  
R. SCHOELL  
TRANSMISSION GEAR  
Filed Jan. 11, 1928

1,696,331

3 Sheets-Sheet 1

INVENTOR.
Reinhold Schoell
BY
his ATTORNEY.

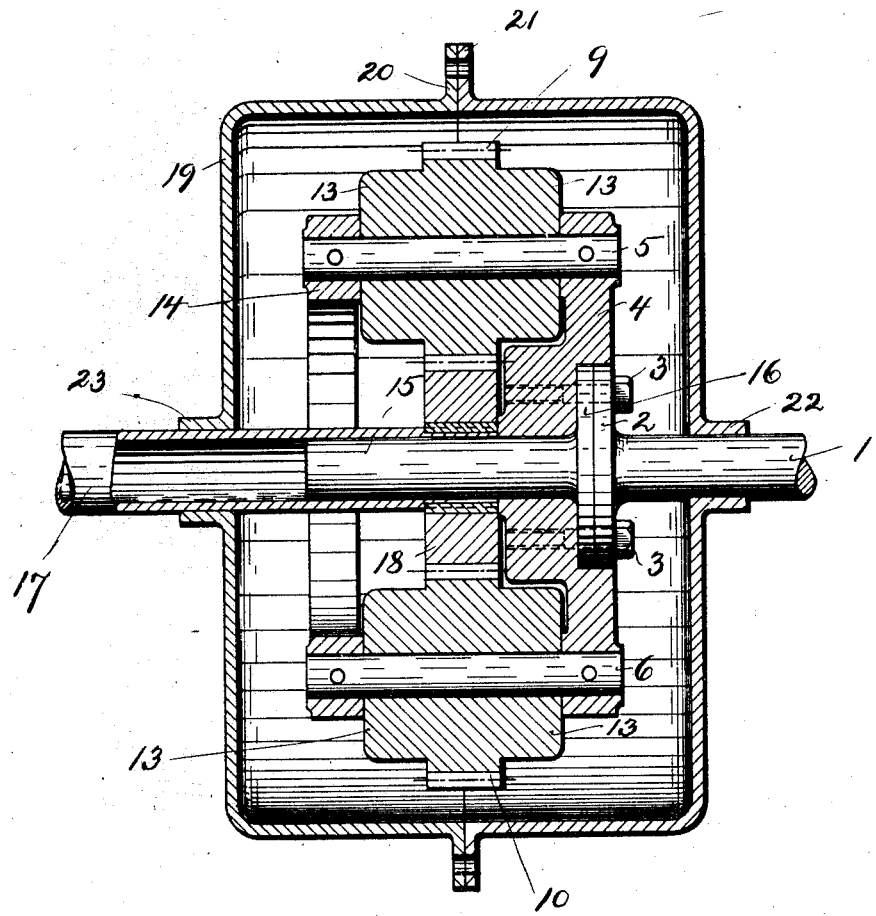

Dec. 25, 1928.
R. SCHOELL
1,696,331
TRANSMISSION GEAR
Filed Jan. 11, 1928　　3 Sheets-Sheet 3
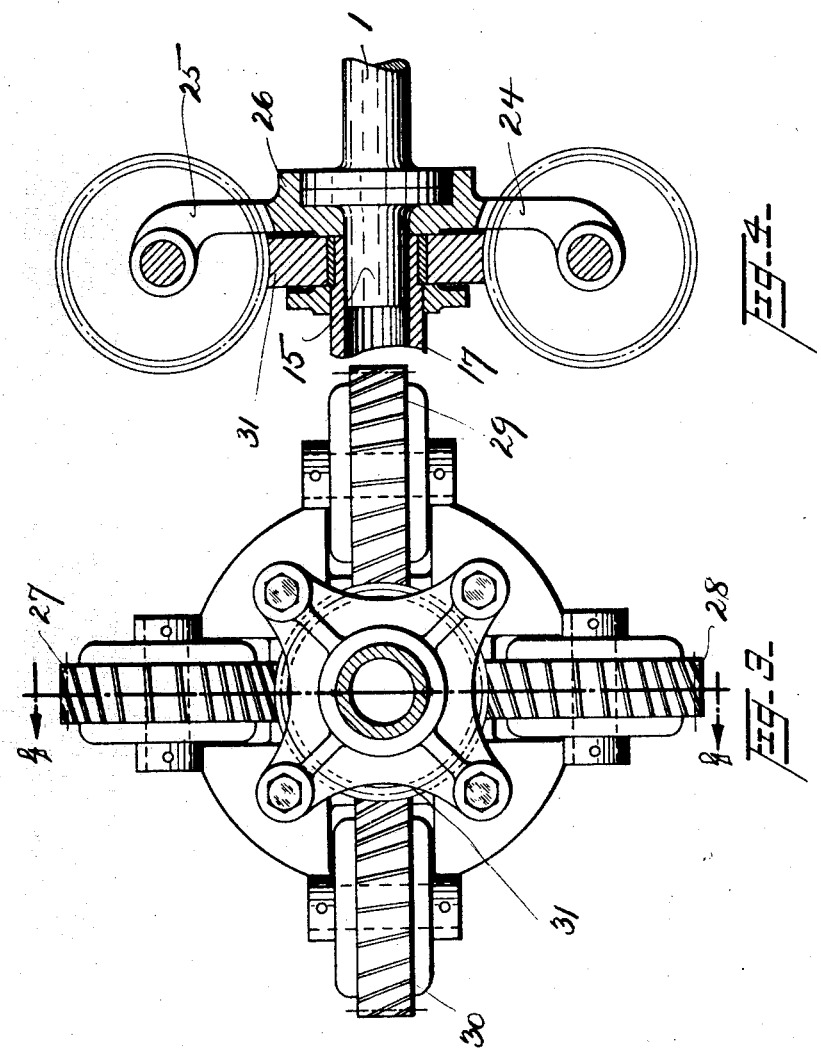
INVENTOR.
Reinhold Schoell
BY
his ATTORNEY.

Patented Dec. 25, 1928.

1,696,331

UNITED STATES PATENT OFFICE.

REINHOLD SCHOELL, OF KELSEY CITY, FLORIDA.

TRANSMISSION GEAR.

Application filed January 11, 1928. Serial No. 245,909.

My invention consists in an automatic transmission gear very simple in design and operation and which while principally adapted for motor driven vehicles may be used anywhere where power is transmitted from a driving shaft, or member, to a driven shaft, or member. The rotation of the driving shaft is transmitted to the driven shaft with gradually increasing speed and without any change in the relative position of the power transmitting parts.

In the annexed drawing, in which I have for the purpose of illustration, shown an embodiment of my invention, Fig. 1 is an end elevation of my novel transmission gear and Fig. 2 a central vertical section along line 2—2 in Fig. 1. Figs. 3 and 4 are similar views as Figs. 1 and 2 showing a modification.

1 is the motor or driving shaft provided with a flange 2 to which is secured by bolts 3, or the like, a heavy disk 4 constituting a fly-wheel. In this disk, or fly-wheel, are provided near the periphery thereof pivot pins 5, 6, 7 and 8 on which pivot pins are rotatably journalled toothed gear-wheels 9, 10, 11 and 12 respectively. These gear wheels, as more clearly shown in Fig. 2 are made with laterally projecting portions as indicated at 13 in said figure so as to be made heavy and they may be referred to as symmetrically balanced weighted gears. At 14 is shown a ring for holding the toothed gear wheels in position.

To the flange 2 of the motor or driving shaft 1 is also secured a short shaft 15 likewise provided with a flange 16, adapted to bear against flange 2 of shaft 1. Said shaft 15 acts as a locating shaft for a hollow shaft 17 which is the driven shaft and has keyed to it a central toothed gear wheel 18. The latter, as shown in Fig. 1 is in mesh with the four toothed gear wheels 9, 10, 11 and 12 carried by the disk 4. The entire mechanism is enclosed in a casing 19 composed of two parts each provided with a flange shown in Fig. 2 at 20 and 21 and also with a boss shown in the same figure at 22 and 23 respectively, said two bosses forming a bearing for the shafts 1 and 17.

The operation of this transmission gear is obvious.

As the disk, or fly-wheel, 4 revolves with the motor, or driving shaft 1, the symmetrically balanced weighted toothed gear wheels 9, 10, 11 and 12 carried on the periphery of the disk, due to the increasing centrifugal force will gradually assume a fixed position determined by the number of revolutions of the fly-wheel, and the resistance of the driven shaft 17. When this fixed position is reached, the gear wheels 9, 10, 11 and 12 will rotate the central toothed gear wheel and thereby the hollow shaft 17 with the same speed as the motor shaft 1.

A modification is shown in Figs. 3 and 4, in which figures, the four gear wheels are rotatably carried on arms, two of which are shown in Fig. 4 at 24 and 25, these arms radially projecting from a common hub 26 secured to the motor-shaft shown at 1 in Fig. 4. At 15 in said figure is shown the short locating shaft and at 17 the hollow driven shaft. In this modification, moreover, the four gear wheels, indicated in Fig. 3 at 27, 28, 29 and 30 are made in the shape of spiral gears and are in mesh with a central spiral gear shown at 31 and keyed to the hollow driven shaft 17. Like the gearwheels shown in Figs. 1 and 2, the spiral gear-wheels are enlarged on both sides to form lateral projections increasing the weight of the gears and constituting the symmetrically balanced weighted gears. The casing has been omitted from Figs. 3 and 4.

The operation, otherwise, is the same as the operation of the transmission gear shown in Figs. 1 and 2.

This transmission is useful also in connection with electric motors, as it will pick up the load gradually bringing it to full motor speed without the extra wiring now required in heavy motors.

While I have shown two embodiments of my transmission gear, it is obvious that it is capable of many other embodiments, and therefore, my invention, of course is not limited to the embodiments as shown.

I claim:

1. In combination with a driving member and a driven member, a central gear-wheel secured to said driven member, a supporting means secured to said driving member so as to rotate therewith, and substantially symmetrically balanced heavy gear-wheels comprising a central toothed portion and a weighted cylindrical extension on either side of said toothed portion rotatably carried by said supporting means near the circumference thereof and in mesh with said central gear wheel so as to produce a uniform rotating force of constant value.

2. In combination with a driving member and a driven member, a central gear-wheel secured to said driven member, a supporting means secured to said driving member so as to rotate therewith, substantially symmetrically balanced heavy gear-wheels comprising a central toothed portion and a weighted cylindrical extension on either side of said toothed portion rotatably carried by said supporting means near the circumference thereof and in mesh with said central gear wheel so as to produce a uniform rotating force of constant value, and a means for retaining said heavy gear-wheels in position on said supporting means.

3. In combination with a driving shaft and a hollow driven shaft, a central gear-wheel secured to said driven shaft, a disk secured to said driving shaft, pivot pins secured in said disk near the periphery thereof, substantially symmetrically balanced heavy gear-wheels comprising a central toothed portion and a weighted cylindrical extension on either side of said toothed portion rotatably mounted on said pivot pins and in mesh with said central gear-wheel so as to produce a uniform rotating force of constant value, and an annular member for retaining said heavy gear wheels in position on said pivot pins.

4. In combination with a driving shaft and a hollow driven shaft, a central gear-wheel secured to said driven shaft, a disk secured to said driving shaft, pivot pins secured in said disk near the periphery thereof, substantially symmetrically balanced heavy gear-wheels comprising a central toothed portion and a weighted cylindrical extension on either side of said toothed portion rotatably mounted on said pivot pins and in mesh with said central gear-wheel so as to produce a uniform rotating force of constant value, an annular member for retaining said heavy gear wheels in position on said pivot pins, and a locating shaft extending from said driving shaft into said hollow driven shaft and being secured to said driving shaft.

In testimony whereof I affix my signature.

REINHOLD SCHOELL.